US008065517B2

(12) United States Patent
Cizas et al.

(10) Patent No.: US 8,065,517 B2
(45) Date of Patent: Nov. 22, 2011

(54) METHOD AND SYSTEM FOR TRANSFERRING INFORMATION TO A DEVICE

(75) Inventors: Jurijus Cizas, Castro Valley, CA (US); Shrinath Eswarahally, Sunnyvale, CA (US); Peter Laackmann, Munich (DE); Berndt Gammel, Markt-Schwaben (DE); Mark Stafford, San Carlos, CA (US); Joerg Borchert, Los Gatos, CA (US)

(73) Assignee: Infineon Technologies AG, Neubiberg (DE)

( * ) Notice: Subject to any disclaimer, the term of this patent is extended or adjusted under 35 U.S.C. 154(b) by 812 days.

(21) Appl. No.: 12/098,011

(22) Filed: Apr. 4, 2008

(65) Prior Publication Data

US 2009/0172392 A1 Jul. 2, 2009

Related U.S. Application Data

(60) Provisional application No. 60/984,648, filed on Nov. 1, 2007.

(51) Int. Cl.
*H04L 29/06* (2006.01)
(52) U.S. Cl. ....................................................... 713/156
(58) Field of Classification Search ........... 713/155–157
See application file for complete search history.

(56) References Cited

U.S. PATENT DOCUMENTS

| 5,970,142 | A | 10/1999 | Erickson |
| 6,237,054 | B1 | 5/2001 | Freitag, Jr. |
| 6,560,665 | B1 | 5/2003 | Resler et al. |
| 6,907,126 | B2 | 6/2005 | Inada |
| 7,162,644 | B1 | 1/2007 | Trimberger |
| 7,203,842 | B2 * | 4/2007 | Kean .............................. 713/189 |
| 7,269,738 | B1 | 9/2007 | Kivimaki |
| 7,546,455 | B2 * | 6/2009 | Kakii ............................. 713/156 |
| 2001/0037457 | A1 | 11/2001 | Inada |
| 2002/0199110 | A1 | 12/2002 | Kean |
| 2003/0126450 | A1 | 7/2003 | Master et al. |
| 2005/0160476 | A1 * | 7/2005 | Kakii ................................ 726/5 |
| 2006/0059368 | A1 | 3/2006 | Fayad et al. |
| 2006/0059369 | A1 * | 3/2006 | Fayad et al. ................... 713/189 |
| 2006/0059372 | A1 * | 3/2006 | Fayar et al. ................... 713/192 |
| 2006/0059373 | A1 * | 3/2006 | Fayad et al. ................... 713/192 |
| 2006/0059574 | A1 * | 3/2006 | Fayad et al. ..................... 726/34 |

(Continued)

FOREIGN PATENT DOCUMENTS

WO 03034199 A2 4/2003

OTHER PUBLICATIONS

The European Search Report for European Patent Application No. 08019118.2 dated Dec. 2, 2009.

(Continued)

*Primary Examiner* — Christian Laforgia
(74) *Attorney, Agent, or Firm* — Dicke, Billig & Czaja, PLLC (57) ABSTRACT

A system and method for transferring information include generating a public/private key pair for programming equipment and sending the programming equipment public key to a certificate authority. A programming equipment certificate is generated using the programming equipment public key and a private key of the certificate authority. The programming equipment certificate and a certificate authority certificate are sent to the programming equipment. Information is transferred to or from the programming equipment in response to an authentication using the programming equipment certificate and the certificate authority certificate.

20 Claims, 5 Drawing Sheets

U.S. PATENT DOCUMENTS

| | | | |
|---|---|---|---|
| 2006/0177064 A1 | 8/2006 | Holtzman et al. | |
| 2006/0277414 A1* | 12/2006 | Kotani et al. | 713/189 |
| 2007/0074045 A1 | 3/2007 | Van Essen et al. | |
| 2007/0168676 A1* | 7/2007 | Fayad et al. | 713/185 |
| 2007/0204170 A1 | 8/2007 | Oren et al. | |
| 2009/0116650 A1* | 5/2009 | Cizas et al. | 380/278 |
| 2010/0031026 A1* | 2/2010 | Cizas et al. | 713/156 |

OTHER PUBLICATIONS

Menezes et al., "Handbook of applied cryptography: Ch. 10 Identification and Entity Authentication", Jan. 1, 1997, pp. 400-405, XP002143934 ISBN: 978-0-8493-8523-0.

B. Schneier, "Applied Cryptography, Second Edition, Protocols, Algorithms, and Source Code in C: Ch. 24 Example Implementations", Jan. 1, 1996, pp. 574-577, XP002922914 ISBN: 978-0-471-11709-4.

European Search Report for European Patent Application No. 08019118.2 dated Feb. 18, 2009 (5 pages).

Kean, Cryptographic Rights Management of FPGA Intellectual Property Cores, Paper, 7 pages.

Simpson et al., Offline HW/SW Authentication for Reconfigurable Platforms, Paper, 13 pages.

* cited by examiner

METHOD AND SYSTEM FOR TRANSFERRING INFORMATION TO A DEVICE

This application claims the benefit of U.S. Provisional Application No. 60/984,648, filed on Nov. 1, 2007, which is incorporated by reference. This application is related to U.S. patent application Ser. No. 12/062,937, "METHOD AND SYSTEM FOR CONTROLLING A DEVICE"; U.S. patent application Ser. No. 12/062,961, "METHOD AND SYSTEM FOR TRANSFERRING INFORMATION TO A DEVICE"; and U.S. patent application Ser. No. 12/062,987, "METHOD AND SYSTEM FOR TRANSFERRING INFORMATION TO A DEVICE"; all filed the same day as the present application and all incorporated by reference.

BACKGROUND

Various integrated circuit devices provide characteristics that can be changed after production, including digital signal processors (DSP), field programmable gate arrays (FPGA), etc. For example, an FPGA is an integrated circuit device containing programmable logic components sometimes referred to as "logic blocks," and programmable interconnects. Logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memories. The logic blocks and interconnects can be programmed after the FPGA is manufactured ("field programmable") to implement the desired functions.

Such devices may have a trustworthiness that is limited due to a lack of a root of trust at the start of the device lifecycle and throughout the subsequent lifecycle stages. The root of trust is where the trustworthiness begins in a process. However, there is no single root of trust available for programming some devices or for subsequent lifecycle management to securely validate integrity.

For these and other reasons, there is a need for the present invention.

SUMMARY

Embodiments of a system and method for transferring information include generating a public/private key pair for programming equipment and sending the programming equipment public key to a certificate authority. A programming equipment certificate is generated using the programming equipment public key and a private key of the certificate authority. The programming equipment certificate and a certificate authority certificate are sent to the programming equipment. Information is transferred to or from the programming equipment in response to an authentication using the programming equipment certificate and the certificate authority certificate.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
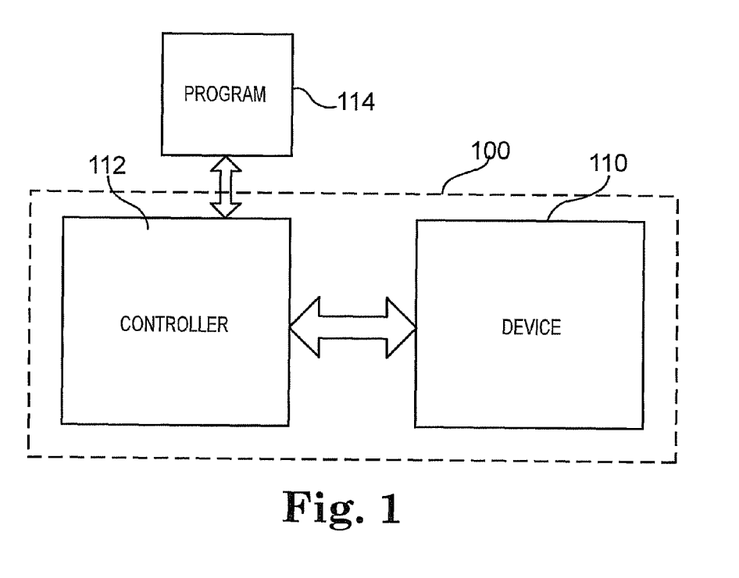
FIG. 1 is a block diagram conceptually illustrating embodiments of portions of a secure system.

FIG. 1 is block diagram conceptually illustrating embodiments of portions of a secure system 100. The system 100 includes one or more devices 110 coupled to a controller 112. In one embodiment, one or more of the devices are integrated circuits. The terms "coupled," "connected," and other similar terms and derivatives are meant to indicate that the relevant elements cooperate or interact with each other regardless of whether they are in direct physical or electrical contact. A single device 110 is illustrated in FIG. 1 and subsequent figures for the sake of simplicity. In the illustrated embodiment, the device 110 has characteristics or software that can be changed or updated after production. In various embodiments, device 110 comprises a digital signal processor (DSP), a field programmable gate array (FPGA) or another suitable type of device. In the illustrated embodiment, the controller 112 is a secure microcontroller that is logically bound to the device 110. An example of a suitable secure microcontroller is a model SLE88CFX4002P microcontroller available from Infineon Technologies AG.

In embodiments where the device 110 is one or more FPGAs, the provision and coupling of the FPGA 110 to the secure microcontroller 112 results in a secure FPGA system 100. This provides trusted electronics, where the secure microcontroller 112 can prove to programming equipment 114 and/or an information or program provider that the one or more FPGAs are genuine and the equipment is not cloned. Further, the secure microcontroller 112 can ensure that FPGA programming is done only by certified programming equipment by not allowing initialization or programming without authentication of the programming equipment 114. Moreover, the secure FPGA system 100 can enable secure and controlled information or program distribution by suppliers in an untrusted environment.

Figure 2:
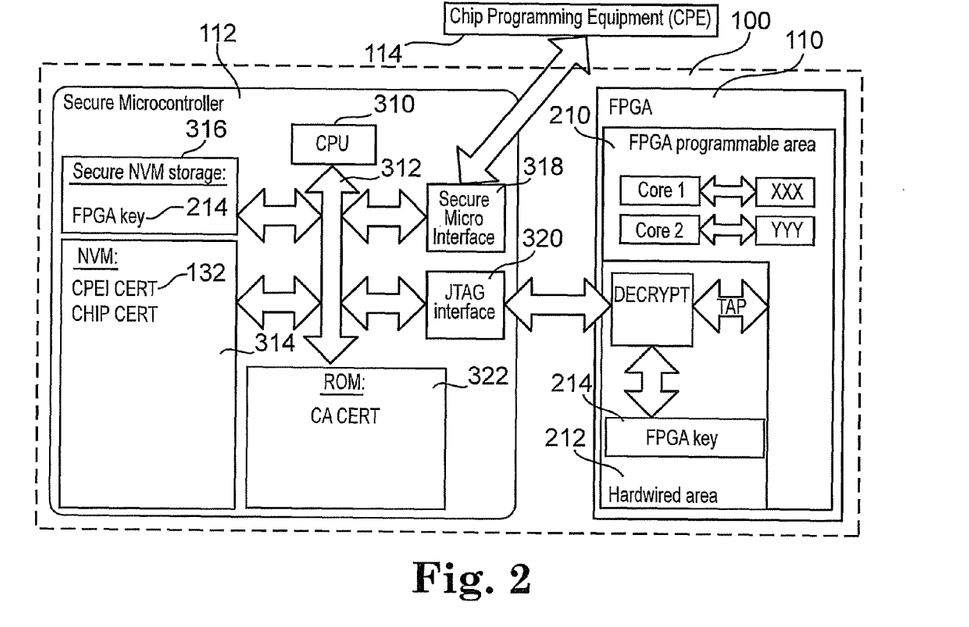
FIG. 2 is a block diagram conceptually illustrating portions of a secure FPGA system.

FIG. 2 is a block diagram conceptually illustrating portions of a secure FPGA system. In the illustrated embodiment, system 100 is a FPGA system, and includes one or more FPGAs 110 coupled to a secure microcontroller 112. The FPGA 110 can be any type of FPGA capable of receiving information, such as configuration or programming information, in an encrypted mode. The FPGA 110 includes a programmable area 210 and a hardwired area 212. More particularly, in exemplary embodiments, the FPGA 110 includes a hardwired symmetric decryption module. In one embodiment, the FPGA 110 is configured to accept programming only in an encrypted mode.

The secure microcontroller 112 includes a central processing unit (CPU) 310 that is coupled via a bus 312 to a nonvolatile memory (NVM) 314, a secure NVM 316, a secure micro interface 318, a test interface 320 and a read only memory (ROM) 322. The secure micro interface 318 can be any suitable interface for communication with programming equipment 114, such as ISO7816, serial, I2C, USB, SPI, parallel bus, etc. A suitable test interface for the interface 320 is the IEEE 1149.1 standard interface, usually referred to as a JTAG (Joint Test Action Group) interface. In alternative embodiments, the secure microcontroller 112 does not include the JTAG interface 320. With such embodiments, another microcontroller or programming device can operate on behalf of the secure microcontroller 112 as a JTAG master and forward encrypted bit streams to the FPGA 110.

A first, or FPGA programming key 214 is stored in a secure storage area of the FPGA hardwire area 212 and also in the secure NVM 316 of the secure microcontroller 112. In this disclosure, a "key" is intended to include one or more keys and can refer to any suitable data that can be used to control access to the relevant device. In certain embodiments, the format of the key is compatible with a symmetrical cryptography algorithm, such as the Advanced Encryption Standard (AES) or the Triple Data Encryption Standard (TDES). In other embodiments, the key includes a block of any suitable predetermined data or random data.

The FPGA programming key 214 cannot be read out of the secure microcontroller 112 or the FPGA 110. In accordance with exemplary implementations, each FPGA 110 has a unique set of keys and certificates; therefore, information cannot be simply copied into multiple chips. This protects against cloning and overbuilding. The FPGA unique programming key 214 is generated by the secure microcontroller 112 during initialization in a secure environment. Since the FPGA unique programming key 214 is stored in the FPGA 110 and in the secure NVM 316 of the secure microcontroller 112, no database or manifest is required to store or transfer the FPGA unique programming keys 214. In the illustrated embodiment, this binds the FPGA to the secure microcontroller because the microcontroller 112 knows the FPGA programming key and the programming key is retained in secure NVM 316.

Figure 3:
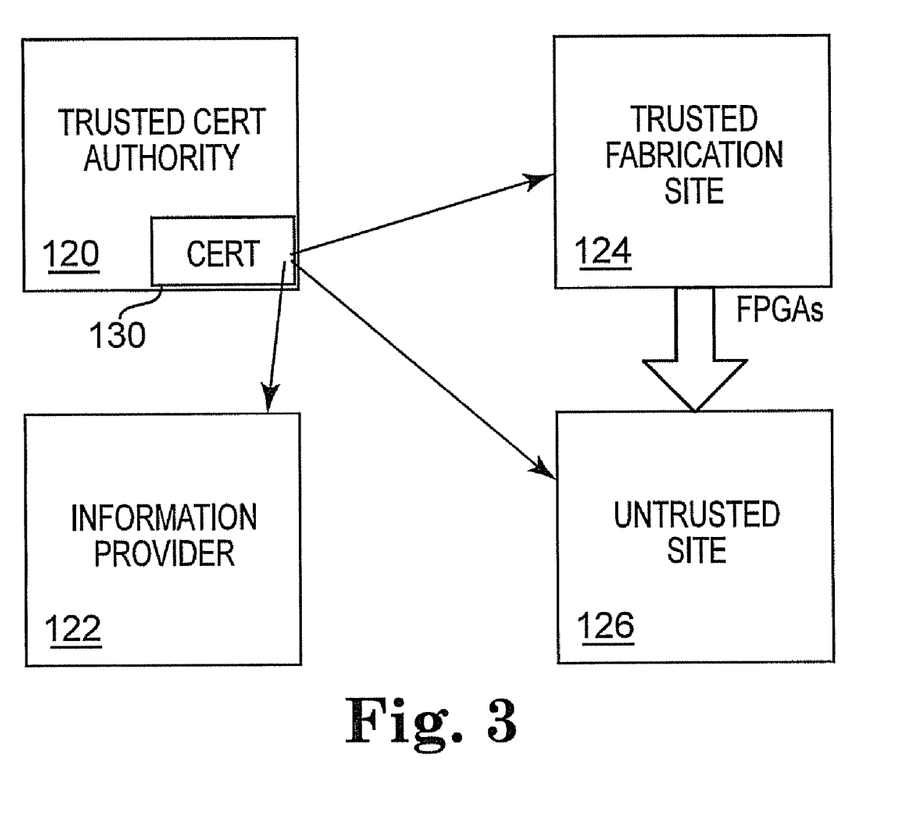
FIG. 3 is a block diagram conceptually illustrating portions of a device environment.

FIG. 3 is a block diagram conceptually illustrating portions of a device environment. In the illustrated embodiment, portions of a life cycle and certificates hierarchy for a secure FPGA system 100 are shown. With FPGAs and certain other devices, it may be necessary to send information, such as updated program files, to the FPGA system 100 that is located at an untrusted site. This information typically is sent over an unsecure public network. The environment illustrated in FIG. 3 includes a trusted certificate authority 120, an information, or intellectual property (IP) provider 122, a trusted fabrication site 124 where the FPGA system 100 is produced and an untrusted site 126 to which the FPGA system 100 is shipped after production.

Figure 4:
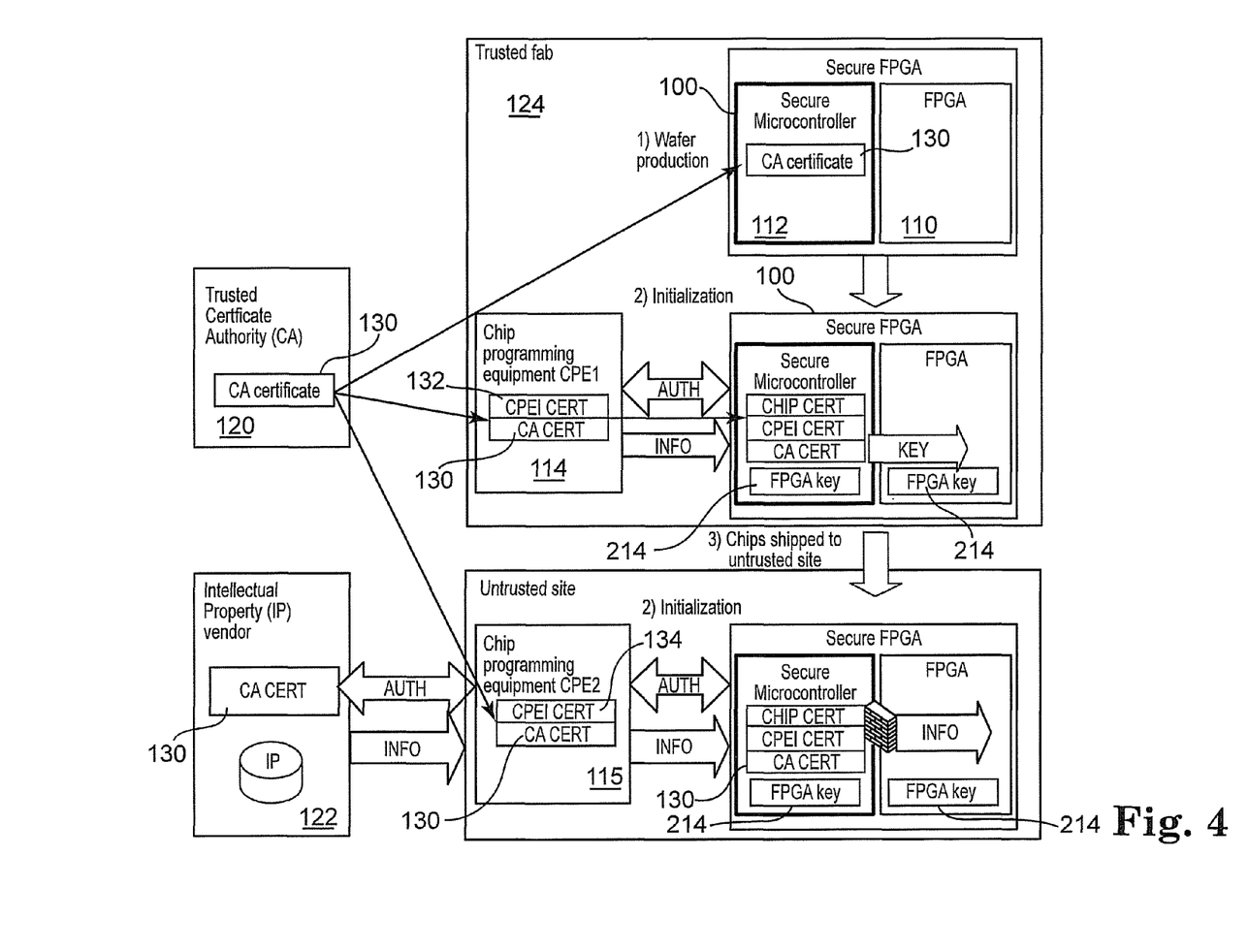
FIG. 4 is a block diagram illustrating further aspects of a device environment.

FIG. 4 is a block diagram illustrating further aspects of a device environment. The chip programming equipment 114 at the fabrication site 124 authenticates to the secure microcontroller 112 before initialization or programming of the FPGA 110, which can thus reject programming attempts from unauthorized programming equipment 114. Prior to initialization, a signed certificate 130 from the trusted certificate authority 120 is stored in the secure microcontroller 112, for example, in the ROM 322. The certificate 130 is also located in the programming equipment 114 at the fabrication site 124, at the information provider 122 and at a second programming equipment 115 located at the untrusted site 126.

To authenticate, the programming equipment 114 must satisfy certain predetermined criteria. For instance, exemplary implementations require the programming equipment 114 to have the valid certificate 132 digitally signed by the trusted certificate authority 120, and the programming equipment 114 must prove to the secure microcontroller 112 that it possesses a programming equipment certificate 132 including a private key (counterpart to a public key or a key pair included in the programming equipment certificate 132). The programming equipment certificate 132 and private key are stored in the NVM 314 of the secure microcontroller 112. The programming equipment authentication ensures that the programming equipment certificate 132 is not copied.

The secure microcontroller 112 also authenticates to the programming equipment 114 before initialization or programming of the FPGA 110. The programming equipment 114 can check the authorization (based on a set of rules and/or a Certificate Revocation List) if information is allowed to be programmed into the Secure FPGA system 100. The secure microcontroller 112 uses the certificate 130 in the initialization process as an initial trust base. The secure microcontroller's operating system, which is also stored in the ROM 322, can be digitally signed by the certificate authority 120 and the signature can be checked by the programming equipment 114. The certificate authority 120 further can maintain and distribute certificate revocation lists containing, for example, a list (or a range) of serial numbers of compromised (lost or stolen) secure FPGA systems 100 or programming equipment devices 114.

Figure 5:
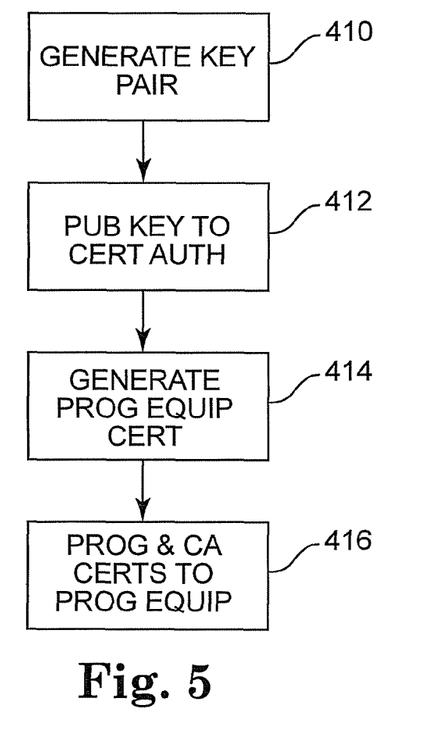
FIG. 5 is a process flow diagram illustrating one embodiment of a process for certifying or recertifying programming equipment.

FIG. 5 is a process flow diagram illustrating one embodiment of a process for certifying or recertifying programming equipment. This process is applicable to either the programming equipment 114 at the fabrication site 124 or the programming equipment 115 at the untrusted site 126. To simplify the disclosure, FIG. 5 is described in terms of the programming equipment 114 at the trusted chip fabrication site 124. For example, the programming equipment certification can be done once in the equipment's life time, such as during its initial manufacture, or it can be repeated periodically when the certificate expires to recertify the equipment.

In block 410, the programming equipment 114 generates and stores in a secure manner a public/private key pair. The programming equipment 114 sends a request for certification to the certificate authority 120, which includes sending the programming equipment public key in block 412. In block 414, the certificate authority 120 generates a new programming equipment certificate 132 and signs it using a certificate authority private key. In block 416, the certificate authority 120 sends the programming equipment certificate 132 to the programming equipment 114, together with the certificate authority certificate 130. Both of the received certificates 130,132 are stored in the programming equipment non-volatile memory and used for authentication with secure FPGA devices 100 and IP vendors 122.

Figure 6:
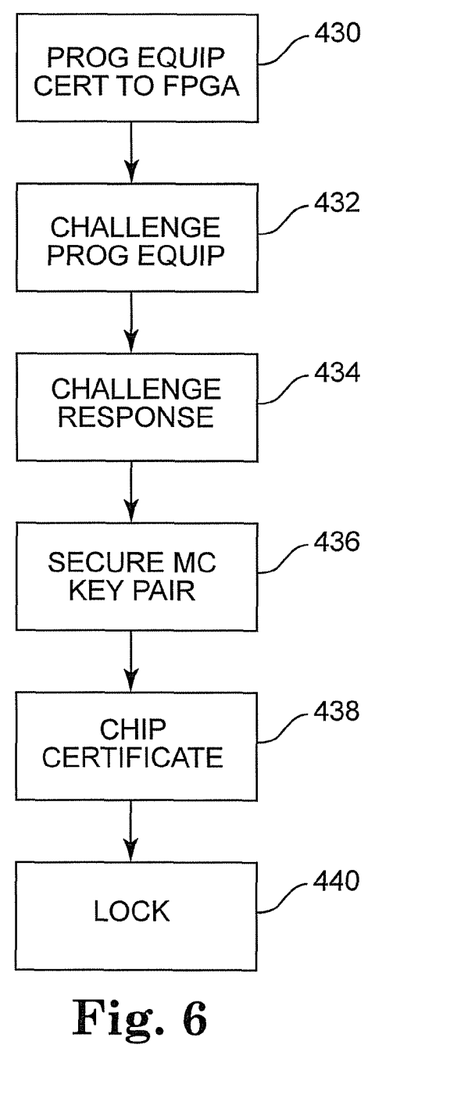
FIG. 6 is a process flow diagram illustrating one embodiment of a process for initializing a device.

FIG. 6 is a process flow diagram illustrating one embodiment of a process for initializing a device. In the illustrated embodiment, the process is for initializing the secure FPGA system 100. In block 430, the programming equipment 114 sends the programming equipment certificate 132 to an un-initialized secure FPGA system 100. The programming equipment 114 communicates with the secure microcontroller 112 via the secure micro interface 318 (see FIG. 2). The secure microcontroller 112 verifies the programming equipment certificate 132 using the certificate 130 stored in ROM 322. As shown in FIG. 4, the certificate 130 is stored in the secure microcontroller ROM 322 during initial production of the device 100. This verification may include, for example, checking the signature using a trusted authority public key (stored in the ROM 322). This verification may also include checking the validity of the certificate 130 from the certificate authority 120.

In block 432, the secure microcontroller 112 sends a challenge, such as a randomly generated number, to the programming equipment 114. In block 434, the programming equipment 114 signs the challenge using the programming equipment private key and sends signed challenge back to the secure microcontroller 112. The secure microcontroller 112 verifies the response using the programming equipment public key from the programming equipment certificate 132 received in block 430. A correct signature proves that the programming equipment 114 has the correct private key (pair to the public key in the certificate 132).

In block 436, the secure microcontroller 112 generates its own public/private key pair, securely stores the private key in the secure NVM 316 and sends the public key to the programming equipment 114. The programming equipment 114 generates a device, or "chip" certificate for the FPGA system 100 and signs it using programming equipment private key. The chip certificate is sent to the secure microcontroller 112 in block 438, and it programs the received chip certificate together with the programming equipment certificate 132 into its secure NVM 316 and/or NVM memory 314. The secure microcontroller 112 generates the FPGA key 214 and stores it in the secure NVM memory 316, and also programs FPGA key 214 into the FPGA key storage of its hardwired area 212. In the illustrated embodiment, the secure microcontroller 112 programs the FPGA key 214 into the FPGA 110 via the JTAG interface 320. In embodiments where the secure microcontroller doesn't have a suitable interface, programming of the FPGA key 214 can also be done by the programming equipment 114. In the process illustrated in FIG. 6, the FPGA key 214 is sent in plain text. Thus, initialization is done in the secure environment of the trusted fabrication site 124. After programming completion the FPGA configuration is permanently locked in block 440. At this point, the FPGA key is known only by the secure microcontroller 112, and FPGA programming is fully controlled by the secure microcontroller 112.

Figure 7:
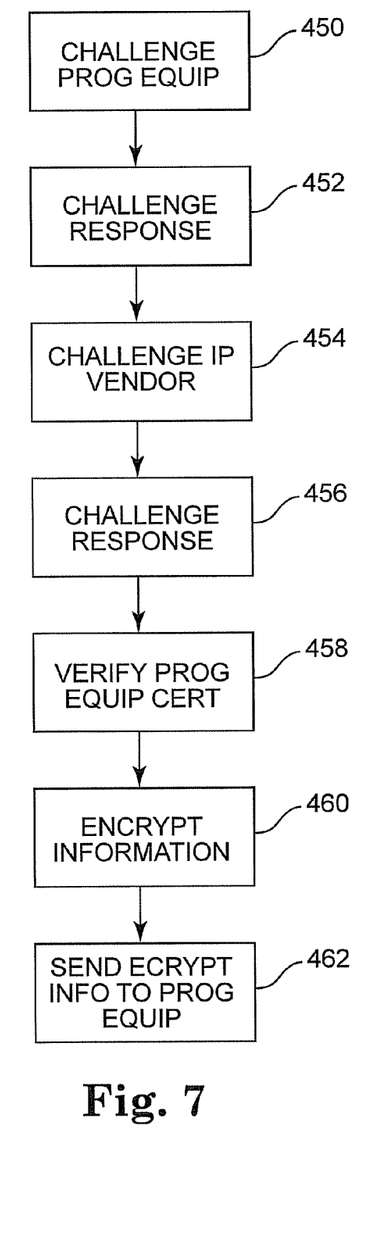
FIG. 7 is a process flow diagram illustrating one embodiment of a process for providing information to a device.

As noted in conjunction with FIG. 4, the initialized secure FPGA devices 100 are typically shipped to an untrusted site 126 after production, where they may require programming, updating, etc. from programming equipment 115 at the untrusted site 126. FIG. 7 illustrates an embodiment of a process for transferring information to a device. In the embodiment illustrated in FIG. 7, the device is the secure FPGA device 100 located at the untrusted site 126.

The programming equipment 115 includes a hardware security module (HSM or SIM), enabling secure storage of information such as programming files and keys at the untrusted site 126. This allows offline information transfer to the FPGA device 100. If programming equipment 115 does not have secure storage capabilities, the Secure FPGA authentication, authorization and information exchange can be performed remotely by another party having these capabilities, such as an IP vendor 122, using the programming equipment 115 as an untrusted connection device.

As shown in the example of FIG. 4, the information provider 122 and the trusted certificate authority 120 can be located remotely from the programming equipment 114,115 and communicate over a public network. The programming equipment can operate offline independently from the information provider 122, and information (multiple programming files, for example) can be stored in the programming equipment local storage in encrypted form.

The programming equipment 115 performs mutual authentication with the information provider site 122 using random challenges, certificates and private keys. In block 450 of FIG. 7, the IP vendor site 122 challenges the programming equipment 115, for instance, by sending a random number. The programming equipment 115 responds to the challenge in block 452 by signing the challenge with the programming equipment private key. In block 454, the programming equipment 115 sends a challenge to the IP vendor 122 in a similar manner, and the IP vendor 122 responds in block 456.

In block 458, the IP vendor 122 verifies the programming equipment certificate, for example, by checking a certificate revocation list and decides if the programming equipment 115 can receive the requested information. Once the programming equipment 115 is authenticated, the IP vendor 122 encrypts the information to be sent to the secure FPGA 100 using the programming equipment public key in block 460. In block 462, the IP vendor 122 sends the encrypted information to the programming equipment 115. This information is stored in a nonvolatile programming equipment storage in encrypted form.

Figure 8:
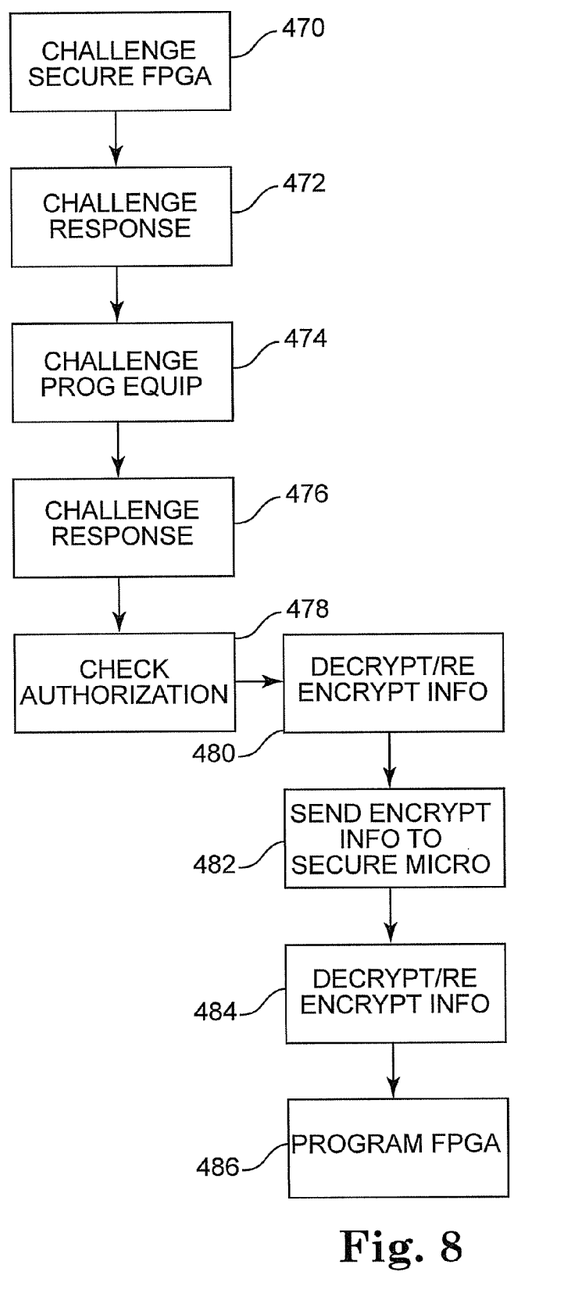
FIG. 8 is a process flow diagram illustrating one embodiment of a process for programming a device.

FIG. 8 is a process flow diagram illustrating one embodiment of a process for programming a device. In the embodiment illustrated in FIG. 8, a process for programming the device 100 at the untrusted site 126 using the encrypted information from the programming equipment 115 is illustrated. The information is received by the programming equipment 115 using a process such as that described in conjunction with FIG. 7.

As with other processes disclosed herein, the secure FPGA device 100 and the programming equipment 115 perform a mutual authentication. In block 470, the programming equipment 115 starts the mutual authentication by sending a challenge to the FPGA device 100. In exemplary embodiments, this includes sending a randomly generated number to the secure microcontroller 112. In block 472, the secure microcontroller responds to the challenge by signing the programming equipment challenge using the chip private key. The secure microcontroller 112 also sends to the programming equipment 115 the chip certificate and the certificate of the programming equipment 114 (programmed during the Secure FPGA initialization illustrated in FIG. 6).

In block 474, the secure FPGA 100 challenges the programming equipment 115, such as by sending a random number generated by the secure microcontroller 112. The programming equipment 115 verifies the signature of the received chip certificate using received programming equipment 114 public key, the signature of received programming equipment 114 certificate using the certificate authority 120 public key (stored in the programming equipment 115) and the received programming equipment 115 challenge signature using the public key from the chip certificate. The correct signature proves that the secure FPGA 100 has the right private key (pair to public key in chip certificate), and that the chip certificate is not cloned.

In block 476, the programming equipment 115 signs the chip challenge using its private key and responds to the secure FPGA 100, including sending the certificate of the programming equipment 115. The secure microcontroller 112 verifies the received signature using the programming equipment 115 public key from the received programming equipment certificate. At this point, mutual authentication is complete, and both the secure microcontroller 112 and the programming equipment 115 can trust each other.

In block 478, the programming equipment 115 decides whether the FPGA system 100 is allowed to receive the requested information, for example, by checking the IP vendor authorization to program information into this particular device 100. This can be implemented via IP access rules and/or an FPGA certificate revocation list.

Assuming the secure FPGA device 100 is authorized to receive the information, the programming equipment 115 decrypts the information using the programming equipment 115 private key, and then re-encrypts it using the chip public key in block 480. In block 482, the encrypted information is sent to the secure microcontroller 112. This information can be sent in blocks, where every block can be confirmed by a handshake response. In certain embodiments, an error recovery mechanism is implemented.

The secure microcontroller 112 decrypts the received information using the chip private key, then re-encrypts it using FPGA symmetric key. The secure microcontroller 112 then programs encrypted information into the FPGA 110. The secure microcontroller 112 uses the JTAG interface 152 for programming of the FPGA 110. Alternatively, the programming can be done by the programming equipment if the secure microcontroller 112 does not have a JTAG interface. The FPGA decryption engine decrypts the information using the FPGA key and stores it in a FPGA configuration.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of transferring information, comprising:
   generating a public/private key pair for programming equipment;
   sending from the programming equipment a request for certification including the programming equipment public key to a certificate authority;
   generating by the certificate authority a programming equipment certificate using the programming equipment public key and a private key of the certificate authority;
   sending the programming equipment certificate from the certificate authority to the programming equipment;
   sending a certificate authority certificate from the certificate authority to the programming equipment;
   sending the certificate authority certificate directly from the certificate authority to a programmable device;
   storing the certificate authority certificate in a memory of the programmable device;
   sending the programming equipment certificate from the programming equipment to the programmable device;
   verifying the programming equipment certificate by a processor of the programmable device using the certificate authority certificate stored in the memory of the programmable device; and thereafter,
   transferring information to or from the programming equipment.

2. The method of claim 1, further comprising:
   storing the programming equipment certificate and the certificate authority certificate in a memory of the programming equipment.

3. The method of claim 1, wherein transferring information comprises sending information to the programmable device.

4. The method of claim 1, wherein transferring information to or from the programming equipment comprises receiving information from an information provider.

5. The method of claim 1, further comprising:
   sending a challenge from the programmable device to the programming equipment;
   sending a response from the programming equipment to the programmable device;
   verifying the response using the programming equipment certificate;
   generating a public/private key pair for the programmable device;
   sending the programmable device public key to the programming equipment;
   generating a device certificate for the programmable device using the programming equipment private key;
   sending the device certificate to the programmable device; and
   sending the programming equipment certificate to the programmable device.

6. The method of claim 5, wherein sending a response from the programming equipment to the programmable device includes:
   signing the challenge from the programmable device using the programming equipment private key;
   sending the signed challenge to the programmable device.

7. The method of claim 6, wherein verifying the response using the programming equipment certificate includes using the public key from the programming equipment certificate.

8. The method of claim 1, wherein transferring information comprises sending encrypted information to a controller coupled to the programmable device.

9. A method of initializing a programmable device, comprising:
   storing a programming equipment certificate and a certificate authority certificate in a memory of programming equipment;
   sending the programming equipment certificate from the programming equipment to a programmable device;
   storing the programming equipment certificate in a memory of the programmable device;
   verifying the programming equipment certificate by a processor of the programmable device using the certificate authority certificate stored in the memory of the programmable device;
   sending a challenge from the programmable device by the processor to the programming equipment;
   sending a response from the programming equipment to the programmable device;
   verifying the response by the processor using the programming equipment certificate stored in the memory of the programmable device;
   generating a public/private key pair for the programmable device;

sending the programmable device public key to the programming equipment;
generating a programmable device certificate for the programmable device using the programming equipment private key;
sending the programmable device certificate to the programmable device; and
sending the programming equipment certificate to the programmable device.

10. The method of claim 9, further comprising:
generating and storing a programmable device key in the memory of the programmable device.

11. The method of claim 10, wherein the programmable device key is a symmetric key.

12. The method of claim 10, wherein the programmable device includes a controller having the processor, and wherein the programmable device key is generated by the controller and sent to a secure storage area of the programmable device.

13. The method of claim 12, wherein the programmable device key is sent from the controller to the secure storage area of the programmable device using a JTAG interface.

14. The method of claim 10, wherein the programmable device key is generated by the programming equipment.

15. A system, comprising:
a first programming equipment including a memory storing a first programming equipment certificate and a certificate authority certificate;
a programmable device having a memory storing a programmable device certificate, the first programming equipment certificate and the certificate authority certificate;
a second programming equipment including a memory storing a second programming equipment certificate and the certificate authority certificate;
the programmable device including a first communications interface for selectively communicating with the first and second programming equipment;
an information provider computer system including a memory storing an information provider certificate and the certificate authority certificate; and
a communications network for selectively communicating between the second programming equipment and the information provider computer system;
wherein the first programming equipment and the programmable device are configured to initialize the programmable device, including verifying the first programming equipment certificate using the certificate authority certificate stored in the memory of the programmable device, generating a programmable device public and private key pair, sending the programmable public key to the first programming equipment, and thereafter generating and sending the programmable device certificate from the first programming equipment to the programmable device;
wherein the information provider computer system is configured to send programming information to the second programming equipment after verifying the second programming equipment certificate using the certificate authority certificate; and
wherein the second programming equipment is configured to program the programmable device after verifying the first programming equipment certificate using the certificate authority certificate.

16. The system of claim 15, wherein the programmable device includes a microcontroller coupled to an FPGA, the FPGA includes a memory configured to store a FPGA key, and wherein the microcontroller includes a memory configured to store the programmable device certificate, the first programming equipment certificate, the certificate authority certificate and the FPGA key.

17. The system of claim 15, wherein the first programming equipment is located at a trusted site.

18. The system of claim 15, wherein the second programming equipment is located at an untrusted site.

19. The system of claim 15, wherein the secure microcontroller and the FPGA include a JTAG interface.

20. An updatable device system, comprising:
programming equipment including a memory storing a programming equipment certificate and a certificate authority certificate;
an updatable device having a memory storing a updatable device certificate, the programming equipment certificate and the certificate authority certificate;
a communication interface between the programming equipment and the updatable device;
wherein the programming equipment and the updatable device are configured to:
send the programming equipment certificate to the updatable device;
verify the programming equipment certificate using the certificate authority certificate;
send a challenge from the updatable device to the programming equipment;
send a response from the programming equipment to the updatable device;
verify the response using the programming equipment certificate;
generate a public/private key pair for the updatable device;
send the updatable device public key to the programming equipment;
generate an updatable device certificate for the updatable device using the programming equipment private key; and
send the updatable device certificate together with the programming equipment certificate to the updatable device.

* * * * *